United States Patent
Houillion et al.

(10) Patent No.: US 6,198,103 B1
(45) Date of Patent: Mar. 6, 2001

(54) NUCLEAR LEVEL SENSING GAUGE USING SCINTILLATING FIBER BUNDLE

(75) Inventors: Paul L. Houillion, Loveland; Kevin L. Carmichael, Fairfield, both of OH (US)

(73) Assignee: Ohmart/Vega Corporation, Cincinnati, OH (US)

( * ) Notice: Subject to any disclaimer, the term of this patent is extended or adjusted under 35 U.S.C. 154(b) by 0 days.

(21) Appl. No.: 09/050,732

(22) Filed: Mar. 30, 1998

(51) Int. Cl.⁷ .............................. G01T 1/203; G01F 23/00
(52) U.S. Cl. ........................................................ 250/357.1
(58) Field of Search .............................. 250/357.1, 362, 250/369, 367, 361 R

(56) References Cited

U.S. PATENT DOCUMENTS

| | | |
|---|---|---|
| 3,473,021 | 10/1969 | Elliott et al. . |
| 3,884,288 | 5/1975 | Berry . |
| 4,146,077 | 3/1979 | Klein et al. . |
| 4,437,007 | 3/1984 | Koslow et al. . |
| 4,471,223 * | 9/1984 | Hurst et al. ........................ 250/357.1 |
| 4,481,595 | 11/1984 | Schiessl et al. . |
| 4,611,117 * | 9/1986 | Seibert et al. ..................... 250/252.1 |
| 4,651,800 | 3/1987 | Kollberg . |
| 4,735,253 | 4/1988 | Vaterlaus . |
| 4,739,819 | 4/1988 | Ericksson et al. . |
| 4,788,436 | 11/1988 | Koechner . |
| 5,072,774 | 12/1991 | Schilcher . |
| 5,218,202 * | 6/1993 | Evers ................................ 250/252.1 |
| 5,258,145 * | 11/1993 | Nelson .................................... 264/21 |
| 5,331,163 | 7/1994 | Leahey et al. . |
| 5,351,203 | 9/1994 | Hoffman et al. . |
| 5,564,487 | 10/1996 | Cahill et al. . |
| 5,990,483 * | 11/1999 | Shariv et al. ......................... 250/397 |

OTHER PUBLICATIONS

Linear Technology, *Ultra Fast Precision Comparator,* Linear Technology LT1016 Data Sheet, pp. 6–25 to 6–29, No Date.

Analog Devices, *Ultralow Distortion, Wide Bandwidth Voltage Feedback Op Amps,* Analog Devices AD9631/AD9632 Products Data Sheet, Printed Nov. 1994.

Hamamatsu Photonics, K.K., *Photomultiplier Tubes R6094, R6095,* Hamamatsu Handout, Tentative Data Oct. 1994.

Bicron, *Scintillating Optical Fibers,* Saint–Gobain Industrial Ceramics Brochure, No Date.

Patent Abstracts of Japan, *Radiation Dose Measuring Method and Apparatus,* Power Reactor & Nuclear Fuel Dev Corp.; Pub. No. 0908156 dated Mar. 28, 1997.

* cited by examiner

Primary Examiner—Constantine Hannaher
Assistant Examiner—Albert Gagliardi
(74) Attorney, Agent, or Firm—Wood, Herron & Evans, L.L.P.

(57) ABSTRACT

A nuclear level sensing gauge for measuring the level of product in a bin utilizes a bundle of scintillating fibers. A source of nuclear radiation positioned adjacent the bin, and a bundle of one or more scintillating fibers is positioned adjacent the bin opposite the source of nuclear radiation such that nuclear radiation passing through the bin impinges upon the bundle. Circuitry detects scintillating photons generated in the fibers, which are indicative of radiation passing through the bin. The number of photons generated in the fibers is representative of the level of radiation-absorbing product in the bin.

33 Claims, 1 Drawing Sheet

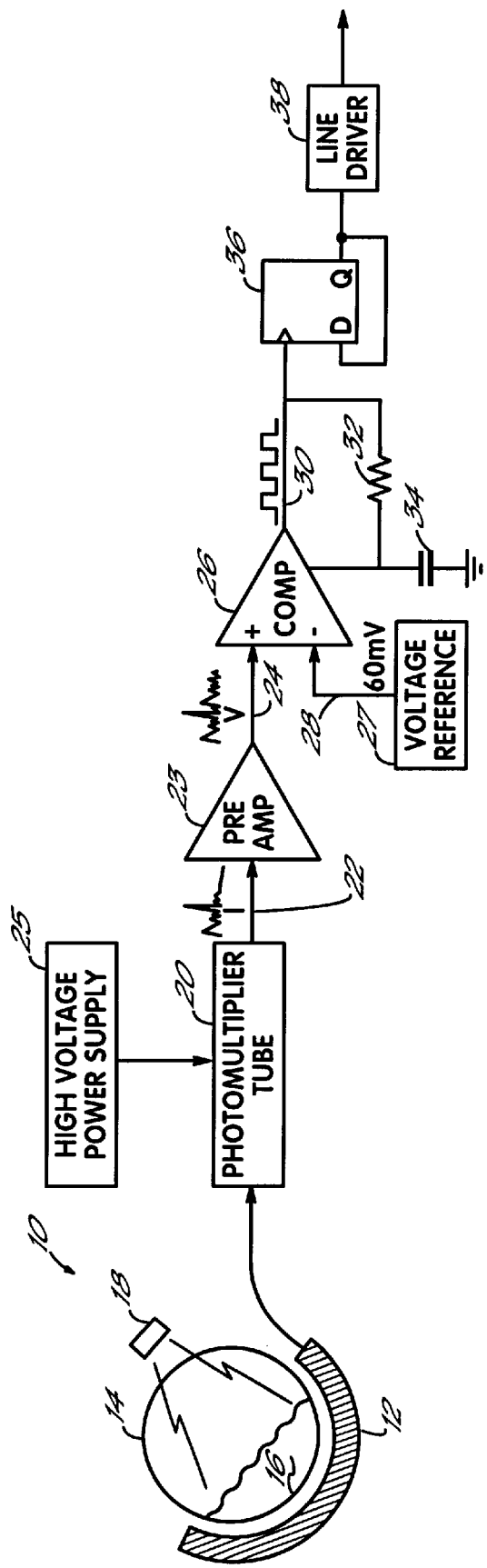

NUCLEAR LEVEL SENSING GAUGE USING SCINTILLATING FIBER BUNDLE

FIELD OF THE INVENTION

The present invention relates to level sensing gauges for detecting the level of product in a tank or other container.

BACKGROUND OF THE INVENTION

In many industrial environments, it is necessary to detect the level of product in a holding tank or bin. Level sensors are typically attached to the holding tank or bin, and electrically connected to remote gauges at a control room or other central location, where technicians or control systems may monitor the status of the bins to provide the appropriate process control.

Various technologies have been developed for level sensing. These include various contact sensing technologies using floats or drop weights, as well as various non-contact technologies such as reflecting electromagnetic radiation or ultrasonic vibrations from the surface of the product in the bin to determine the height of the product.

In some applications, it is particularly important to move the sensor away from the product. For example, in a foundry where the level of a hot melt of steel or ore is to be level sensed, it is particularly important to keep the level sensor a safe distance from the hot melt. In these applications, nuclear level sensing gauges are used.

In a nuclear level sensing gauge, a source of nuclear radiation is positioned on one side of the bin to be level sensed. A nuclear radiation detector is placed on the opposite side of the bin. The radiation exiting the source is in the shape of a wide generally vertically dispersed beam, directed toward the interior of the bin. The product in the bin substantially absorbs the radiation that impinges upon it. If, however, the bin is not full of product, some part of the beam of radiation from the source passes through the bin and exits from the bin on the side opposite to the radiation source, and irradiates the radiation detector. Because the product in the bin substantially absorbs the radiation that impinges upon it, thus reducing the amount of the radiation beam passing through the bin, the amount of radiation stimulating the radiation detector, is inversely proportional to the amount of product to the bin. Thus, the amount of radiation detected by the radiation detector, is compared to minimum and maximum values to produce a measurement of the amount of product in the bin.

In a typical nuclear level sensing gauge, the nuclear detector is based on a scintillating crystal. A scintillating crystal produces light when exposed to nuclear radiation. The amount of light produced is related to the amount of radiation impinging on the crystal. To detect radiation passing through the bin, an elongated scintillating crystal is placed on the side of the bin opposite to the radiation source, with the long dimension of the crystal generally vertically oriented. A light detector coupled to an end of the crystal, detects light emanating from the scintillating crystal, and produces from this a signal indicative of the amount of radiation impinging on the crystal, and thus the level of product in the bin. This type of sensor is discussed in U.S. Pat. Nos. 3,884,288, 4,481,595, 4,651,800, 4,735,253, 4,739,819 and 5,564,487. Other nuclear radiation detection technologies have also been used in nuclear level sensing gauges, e.g., a Geiger tube is shown in U.S. Pat. No. 3,473,021.

Unfortunately, there are several disadvantages with conventional nuclear level sensing gauges, particularly those gauges using scintillating crystals as a radiation detector. First, an elongated scintillating crystal is bulky, heavy and difficult to ship, as well as expensive to custom manufacture in different lengths. Furthermore, in applications where the scintillating detector must be mounted to a curved bin (e.g., where the bin is a transversely mounted rotating basket), the scintillating crystals must be cut into segments, or custom manufactured with the appropriate curvatures, increasing the expense. Also, scintillating light passing through a relatively long scintillating crystal can be substantially attenuated, reducing the effective signal-to-noise performance of the level sensing gauge.

It will also be appreciated that, in many applications, the scintillating crystal in a nuclear level sensing gauge must be temperature controlled, because the scintillation effect is temperature-dependent. Typically, a cooling system must be associated with the scintillating crystal, to carry away heat generated, for example, by the product in the bin or by another source of heat such as direct sunlight. Scintillating crystals have a relatively large heat capacity, and so are relatively difficult to cool.

SUMMARY OF THE INVENTION

In accordance with principles of the present invention, these difficulties of a conventional nuclear level sensing gauge are substantially ameliorated through the use of a bundle of one or more scintillating fibers as the radiation detector, in place of a scintillating crystal. The use of a scintillating fiber yields substantial improvements in cost, performance and ease of use and size and sensitivity configuration as compared to known gauges which use a scintillating crystal. Specifically, compared to a scintillating crystal, the scintillating fibers are light, can be easily coiled for shipment, and are easy to cut to desired lengths. Scintillating fibers can be readily curved to match the curvature of a particular bin, whereas crystals are rigid and difficult to custom manufacture. Also, scintillating fibers have better internal reflection characteristics than crystals, meaning that fiber scintillating sensors can be made longer with less loss than crystal scintillating sensors. Finally, a bundle of one or more fibers can have substantially less heat capacity than the corresponding crystal, meaning the bundle is more readily cooled.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

The sole FIGURE of the drawings shows a nuclear level sensing gauge using a scintillating fiber bundle, and corresponding electronic elements for detecting scintillating light generated by the fiber bundle.

DETAILED DESCRIPTION OF SPECIFIC EMBODIMENTS

Referring to the drawing, a nuclear level sensing gauge 10 in accordance with principles of the present invention comprises a bundle 12 of optical fibers arranged about the periphery of a rotating basket 14 filled with product 16 to be level-sensed. A source 18 of nuclear radiation irradiates the product in the rotating basket with nuclear radiation.

Fiber bundle 12 comprises a bundle of individual scintillating fibers. Suitable fibers for this application are one millimeter diameter blue scintillating fibers available as part number BCF-12 from Bicron (Saint-Gobain/Norton Industrial Ceramics Corporation) at 12345 Kinsman Road, Newbury, Ohio 44065. These fibers are specified for a trapping efficiency of 3.4% to 7%. These fibers can be cut to the desired length for any particular application. A bundle of approximately four hundred fibers, approximately one inch in diameter has been successfully used as a nuclear radiation detector for level sensing. Smaller bundles may also be used for applications requiring less signal strength or noise immunity, and larger bundles may be used for more signal strength and noise immunity. Bundles may be made up to twenty feet in length, or longer, depending on the application, which compares favorably with about a seven to ten foot maximum length for a scintillating crystal. Also, fibers with diameters of two and three millimeter have been tested, in both round and square versions, each appearing to give acceptable sensitivity.

The ends of the scintillating fibers in bundle 12 are coupled directly into a photomultiplier tube 20. The last inch of the bundle of fibers is potted in a clear epoxy resin, which is trimmed to the size of the aperture in the photomultiplier tube, and polished flat. This flat surface is mounted directly with a slight pressure into the end of the photomultiplier tube 20.

The photomultiplier tube 20 has a maximum sensitivity to blue light. Tube 20 produces a current output on line 22 at a gain of about 100 milliAmp per Watt of input light power. A suitable photomultiplier tube can be obtained as part numbers R6094 or R6095 from Hamamatsu Photonics K.K. of Japan, represented in the U.S. at 380 Foothill Road, Bridgewater, N.J. 08807. This tube utilizes a high voltage power supply at 1000 Volts DC, provided by a high voltage power supply 25.

The current output from the photomultiplier tube 20 is delivered to a preamplifier circuit 23 for converting the current output on line 22 to a voltage output on line 24 at a gain of 10 volts per milliAmp of input current. The preamplifier circuit 23 has a 100 MHZ closed loop bandwidth, as is needed to capture the 50–100 nanosecond pulses produced when using a fiber scintillator. The resulting output of the preamplifier has a rise time of 10–12 nanoseconds, which is suitable for capturing the pulses. An ultralow distortion, wide bandwidth voltage feedback operational amplifier is at the heart of this preamplifier. A suitable operational amplifier is sold as part number AD9631/9632 by Analog Devices of One Technology Way, Norwood, Mass. 02062.

The output of preamplifier circuit 23 on line 24 is fed to the noninverting input of an ultra fast precision comparator 26. The inverting input of the comparator is connected to a reference voltage of 60 milliVolts on line 28 generated by a voltage reference 27. Comparator 26 is a 10 nanosecond response time comparator producing a TTL-compatible output voltage on line 30. A suitable comparator is sold as part number LT1016 by Linear Technology.

The digital output signal on line 30 is fed back through an RC circuit including a resistor 32 and capacitor 34, to the latch enable input of comparator 26. Resistor 32 has a value of 1 kiloohm and capacitor 34 has a capacitance of 0.1 microfarad, for a time constant of roughly 7–8 microseconds. This feedback latches the output of comparator 26 to a "high" state for 7–8 microseconds once a pulse of sufficient magnitude has been detected, so that comparator 26 will not produce a pulse stream as a result of ringing in the photomultiplier tube and preamplifier 23 which occurs when a scintillating light pulse has been detected.

The output of comparator 26 on line 30 is fed to a toggle flip flop 36, which divides the pulse frequency by two and produces a lower frequency content digital signal. This digital signal is delivered to line driver 38.

The circuitry shown in the drawing, including photomultiplier tube 20, preamplifier 23, comparator 26, toggle flip flop 36 and line driver 38, are located on a circuit board adjacent to the end of the fiber bundle 12, so as to minimize signal loss prior to amplification. The resulting digital signal output from line driver 38, which is relatively immune from noise, is communicated to a remote circuit board, e.g., in a control room, where it is used to generate a measure of the level of radiation passing through bin 14 and irradiating the fiber bundle 12. Specifically, the output from line driver 38 is received by a line receiver and delivered to a pulse counting circuit (not shown).

In use, the portion of the radiation from source 18 which passes through the product 16 impinges upon the scintillating fiber bundle 12, which responds by producing scintillating light. Scintillating light photons produced in bundle 12 is carried along the individual fibers due to near-total internal reflection in the fibers, and impinges upon the photomultiplier tube where these photons are amplified and converted to a current waveform on line 22. The resulting current waveform is characterized by randomly distributed spikes of various heights, each corresponding to a light impulse produced by radiation impinging upon the fiber bundle 12. Preamplifier 23 converts this current waveform to a voltage waveform on line 24 which has distributed spikes of various heights, each corresponding to the spikes in the current waveform on line 22 and the light impulses produced by radiation impinging upon the fiber bundle 12. Comparator 26 compares these voltage spikes to the noise threshold of 60 milliVolts established by reference 27 to generate a digital pulse train, each digital pulse reflecting a spike in the voltage waveform which is above the 60 milliVolt threshold.

The counting circuit which receives this digital signal from line driver 38 produces an average of the number of digital voltage pulses in this signal over a sliding time window. The number of pulses is a measure of the radiation impinging upon the fiber bundle 12, and thus of the level of the product in the bin 14. This count may be calibrated by determining the number of pulses $P_{empty}$ produced on average during the sliding time window when the bin is empty, and the number of pulses $P_{full}$, produced on average during the sliding time window when the bin is full. A measured number of pulses P can then be converted into a measure of the amount of product in the bin as a percentage of fall, from the equation $$PercentFull = \frac{P - P_{empty}}{P_{full} - P_{empty}}$$

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the fiber bundle and/or nuclear radiation source may be positioned inside of the product-carrying bin instead of being external to the bin. Furthermore, while the use of the fiber bundle to detect product height has been discussed, a fiber bundle might also be used to detect the density of the product or its absorptivity when exposed to nuclear radiation. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A nuclear level sensing gauge for measuring the level of product in a bin, comprising:
    a source of nuclear radiation positioned adjacent the product in the bin,
    a bundle of a plurality of scintillating fibers positioned adjacent the product in the bin opposite the source of nuclear radiation such that nuclear radiation from the source impinges upon the bundle, and
    circuitry detecting scintillating photons generated in the fibers indicative of radiation passing through the product in the bin,
    whereby the number of photons generated in the fibers is representative of the level of radiation-absorbing product in the bin.

2. The nuclear level sensing gauge of claim 1 wherein the bundle comprises a bundle of approximately four hundred scintillating fibers.

3. The nuclear level sensing gauge of claim 1 wherein the bundle is at least ten feet in length.

4. The nuclear level sensing gauge of claim 1 adapted for use with a bin having a curved contour, wherein the bundle is curved to match the contour of the bin.

5. The nuclear level sensing gauge of claim 1 wherein the circuitry for detecting scintillating photons comprises a photomultiplier tube.

6. The nuclear level sensing gauge of claim 5 wherein the circuitry for detecting scintillating photons further comprises an amplifier for amplifying the output of the photomultiplier tube.

7. The nuclear level sensing gauge of claim 6 wherein the circuitry for detecting scintillating photons further comprises a comparator for comparing the output of the amplifier to a noise threshold and producing a digital signal, the number of pulses in the digital signal reflecting the amount of radiation impinging upon the fiber bundle.

8. The nuclear level sensing gauge of claim 7 wherein an output of the comparator is fed back to a latch input of the comparator to latch the output for a predetermined time period, whereby the ringing in the photomultiplier tube and amplifier are reduced in the comparator output.

9. The nuclear level sensing gauge of claim 1 wherein the fibers in the bundle are substantially one millimeter in diameter.

10. The nuclear level sensing gauge of claim 1 wherein the bundle of fibers is substantially one inch in diameter.

11. The nuclear level sensing gauge of claim 1 wherein the source of nuclear radiation and bundle are positioned externally to the bin.

12. A method for measuring the level of product in a bin, comprising:
    positioning a source of nuclear radiation adjacent the product in the bin,
    positioning a bundle of a plurality of scintillating fibers adjacent the product in the bin opposite the source of nuclear radiation such that nuclear radiation from the source impinges upon the bundle, and
    detecting scintillating photons generated in the fibers indicative of radiation passing through the product in the bin,
    whereby the number of photons generated in the fibers is representative of the level of radiation-absorbing product in the bin.

13. The method of claim 12 wherein the bundle comprises a bundle of approximately four hundred scintillating fibers.

14. The method of claim 12 wherein the bundle is at least ten feet in length.

15. The method of claim 12 adapted for use with a bin having a curved contour, further comprising curving the bundle to match the contour of the bin.

16. The method of claim 12 wherein scintillating photons are detected with a photomultiplier tube.

17. The method of claim 16 further comprising amplifying the output of the photomultiplier tube with an amplifier.

18. The method of claim 17 further comprising comparing the output of the amplifier to a noise threshold and producing a digital signal, the number of pulses in the digital signal reflecting the amount of radiation impinging upon the fiber bundle.

19. The method of claim 18 further comprising latching the output of the comparator for a predetermined time period, whereby the ringing in the photomultiplier tube and amplifier are reduced in the comparator output.

20. The method of claim 12 wherein the fibers in the bundle are substantially one millimeter in diameter.

21. The method of claim 12 wherein the bundle of fibers is substantially one inch in diameter.

22. The method of claim 12 wherein the source of nuclear radiation and bundle are positioned externally to the bin.

23. A product handling system including a nuclear level sensing gauge for measuring the level of product in a bin, comprising:
    a bin carrying a product,
    a source of nuclear radiation permanently positioned adjacent the product in the bin,
    a bundle of a plurality of scintillating fibers permanently positioned adjacent the product in the bin opposite the source of nuclear radiation such that nuclear radiation from the source impinges upon the bundle, and
    circuitry detecting scintillating photons generated in the fibers indicative of radiation passing through the product in the bin,
    whereby the number of photons generated in the fibers is representative of the level of radiation-absorbing product in the bin.

24. The product handling system of claim 23 wherein the bundle comprises a bundle of approximately four hundred scintillating fibers.

25. The product handling system of claim 23 wherein the bundle is at least ten feet in length.

26. The product handling system of claim 23 adapted for use with a bin having a curved contour, wherein the bundle is curved to match the contour of the bin.

27. The product handling system of claim 23 wherein the circuitry for detecting scintillating photons comprises a photomultiplier tube.

28. The product handling system of claim 27 wherein the circuitry for detecting scintillating photons further comprises an amplifier for amplifying the output of the photomultiplier tube.

29. The product handling system of claim 28 wherein the circuitry for detecting scintillating photons further comprises a comparator for comparing the output of the amplifier to a noise threshold and producing a digital signal, the number of pulses in the digital signal reflecting the amount of radiation impinging upon the fiber bundle.

30. The product handling system of claim 29 wherein an output of the comparator is fed back to a latch input of the comparator to latch the output for a predetermined time period, whereby the ringing in the photomultiplier tube and amplifier are reduced in the comparator output.

31. The product handling system of claim 23 wherein the fibers in the bundle are substantially one millimeter in diameter.

32. The product handling system of claim 23 wherein the bundle of fibers is substantially one inch in diameter.

33. The product handling system of claim 23 wherein the source of nuclear radiation and bundle are positioned externally to the bin.

* * * * *

UNITED STATES PATENT AND TRADEMARK OFFICE
CERTIFICATE OF CORRECTION

PATENT NO. : 6,198,103 B1
DATED : March 6, 2001
INVENTOR(S) : Houillion et al.

It is certified that error appears in the above-identified patent and that said Letters Patent is hereby corrected as shown below:

<u>Column 1,</u>
Lines 43 and 45, delete "radiation detector, is" and insert -- radiation detector is --.
Line 56, delete "the crystal, detects" and insert -- the crystal detects --.

<u>Column 3,</u>
Line 20, delete "three millimeter have" and insert -- three millimeters have --.
Line 44, delete "100 MHZ closed" and insert -- 100 MHz closed --.

<u>Column 4,</u>
Line 11, delete "38, are located" and insert -- 38, is located --.
Line 25, delete "12 is carried" and insert -- 12 are carried --.
Line 26, delete "and impinges upon" and insert -- and impinge upon --.
Line 50, delete "pulses $P_{full}$, produced" and insert -- pulses $P_{full}$ produced --.
Line 53, delete "of fall, from" and insert -- of full, from --.

Signed and Sealed this

Eleventh Day of April, 2006

JON W. DUDAS
*Director of the United States Patent and Trademark Office*